(12) United States Patent
Nakajima

(10) Patent No.: US 10,216,044 B2
(45) Date of Patent: Feb. 26, 2019

(54) LIQUID CRYSTAL DEVICE AND ELECTRONIC APPARATUS

(71) Applicant: Seiko Epson Corporation, Tokyo (JP)

(72) Inventor: Osamu Nakajima, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 66 days.

(21) Appl. No.: 14/938,548

(22) Filed: Nov. 11, 2015

(65) Prior Publication Data

US 2016/0147121 A1    May 26, 2016

(30) Foreign Application Priority Data

Nov. 21, 2014    (JP) .................... 2014-236282

(51) Int. Cl.
*G02F 1/1339*    (2006.01)
*G02F 1/1345*    (2006.01)
*G02F 1/1333*    (2006.01)

(52) U.S. Cl.
CPC ........ *G02F 1/1339* (2013.01); *G02F 1/13452* (2013.01); *G02F 1/133345* (2013.01); *G02F 2201/50* (2013.01)

(58) Field of Classification Search
CPC ............... G02F 1/13452; G02F 1/1339; G02F 1/133345
See application file for complete search history.

(56) References Cited

U.S. PATENT DOCUMENTS

| | | |
|---|---|---|
| 5,530,568 A | 6/1996 | Yamamoto et al. |
| 5,748,266 A | 5/1998 | Kodate |
| 6,346,976 B1 | 2/2002 | Komeno et al. |
| 6,404,473 B1 | 6/2002 | Kaneko et al. |
| 2004/0245551 A1* | 12/2004 | Murade ............ G02F 1/133512 257/222 |
| 2005/0213017 A1 | 9/2005 | Yamaguchi et al. |
| 2012/0212684 A1* | 8/2012 | Ochiai ................ G02F 1/13458 348/790 |
| 2013/0128210 A1* | 5/2013 | Nagasawa ........... G02F 1/13452 349/151 |

FOREIGN PATENT DOCUMENTS

| | | |
|---|---|---|
| JP | 07-140467 A | 6/1995 |
| JP | 07-146481 A | 6/1995 |
| JP | 08-262484 A | 10/1996 |
| JP | 11-002843 A | 1/1999 |
| JP | 2000-155329 A | 6/2000 |
| JP | 2004-090204 A | 3/2004 |
| JP | 2004-354969 A | 12/2004 |
| JP | 2005-275144 A | 10/2005 |

\* cited by examiner

*Primary Examiner* — Jessica M Merlin
(74) *Attorney, Agent, or Firm* — ALG Intellectual Property, LLC

(57) ABSTRACT

In a first substrate of a liquid crystal device, among wiring lines extending to a non-display area interposed between a display area and an outer edge of a seal material, common potential lines are provided to interpose an interlayer insulating film between pixel electrodes. In contrast, the wiring lines which supply potentials different from common potentials is provided so as to interpose interlayer insulating films between the pixel electrodes. In the common potential lines, second wiring line sections extend so as to surround an entire circumference of the display area in the non-display area.

12 Claims, 6 Drawing Sheets

LIQUID CRYSTAL DEVICE AND ELECTRONIC APPARATUS

BACKGROUND

1. Technical Field

The present invention relates to a liquid crystal device in which a liquid crystal layer is provided between a first substrate and a second substrate, and an electronic apparatus including the liquid crystal device.

2. Related Art

In a liquid crystal device, a liquid crystal layer is provided in an area between a pair of substrates (first substrate and second substrate) and surrounded by a seal material, and a liquid crystal layer is driven between pixel electrodes provided on a first substrate and common electrodes provided on a second substrate. In addition, a substrate conducting portion is provided between a first substrate and a second substrate, and supplies common potentials to the common electrode via the common potential lines formed on the first substrate and the substrate conducting portion.

In the liquid crystal device, if ionic impurities included in the seal material intrude into a liquid crystal layer and reach a display area, display qualities such as display unevenness and stain are degraded. Therefore, there is suggested a technique of suppressing penetration of ionic impurities to the display area between the display area and the seal material, by causing non-display area electrodes provided on the same layer with pixel electrodes on the first substrate and common electrodes of the second substrate to face each other via the liquid crystal layer, and applying common potentials to the non-display area (see JP-A-2005-275144).

However, the inventors of the invention reviewed to find that it is difficult to securely prevent the intrusion of ionic impurities to a display area only by causing the non-display area electrodes and the common electrodes to face each other between the display area and the seal material via the liquid crystal layer, and then to apply the common potentials to the non-display area. That is, if the wiring line that supplies potentials other than the common potentials extends on the lower layer side than the pixel electrodes, ionic impurities extrude from seal material and intrude into the display area due to the influence of the potentials of the wiring line.

SUMMARY

An advantage of some aspects of the invention is to provide a liquid crystal device that can suppress the decrease of display qualities by optimizing a configuration of extended wiring lines in a non-display area and the electronic apparatus.

According to the invention, on the surface side of the first substrate which faces the second substrate, in the non-display area inside the area surrounded by the seal material, common potential lines extend along the display area at the positions close to the liquid crystal layer, but the wiring lines that supplies potentials other than the common potentials is disposed at positions farther from the liquid crystal layer than the common potential lines. Therefore, the liquid crystal layer is influenced by the common potential lines in the non-display area, and is hardly influenced the potentials of the wiring lines. Accordingly, since the alignment of the liquid crystal layer in the non-display area can be equalized, the decrease of the quality of the image caused by the potential of the wiring lines can be suppressed. In addition, since the potentials of the wiring lines hardly influence the liquid crystal layer or the seal material, the extrusion of the ionic impurities from the seal material or the intrusion of the extruded ionic impurities into the display area can be suppressed. Therefore, the decrease of qualities of an image with time can be suppressed.

According to the invention, there is a liquid crystal device including a first substrate that includes a display area in which pixel electrodes are disposed, and a non-display area which is disposed to surround the display area; a second substrate in which common electrodes facing the pixel electrodes are disposed; a seal material which is between the first substrate and the second substrate and which is disposed to surround the display area and the non-display area; a liquid crystal layer disposed inside an area surrounded by the seal material; a plurality of wiring lines disposed in the non-display area inside the area surrounded by the seal material; and a substrate conducting portion which is disposed outside the area surrounded by the seal material, and which brings conduction between conducting electrodes between substrates of the first substrate and conducting electrodes between substrates of the second substrate. The plurality of wiring lines include common potential lines to which common potentials applied to the common electrode are supplied and other wiring lines to which potentials other than the common potentials are supplied, the first substrate includes a first conductive layer, a second conductive layer, and a third conductive layer, from a side close to the liquid crystal layer, the pixel electrode is disposed in the first conductive layer, the common potential line is disposed in the second conductive layer, and the other wiring line is disposed in the third conductive layer.

According to the invention, it is preferable that the common potential lines extend along the display area in the non-display area inside the area surrounded by the seal materials. According to the configuration, along the outer edge of the display area, the alignment of the liquid crystal layer in the non-display area can be equalized.

According to the invention, it is preferable that the common potential lines extend so as to surround an entire circumference of the display area in the non-display area. According to the configuration, along the entire circumference of the display area, the alignment of the liquid crystal layer in the non-display area can be equalized.

According to the invention, it is possible to employ the configuration of having a second insulating film provided on the opposite side of the second substrate of the common potential line and a third insulating film provided on the opposite side of the second insulating film to the second substrate, on the surface side of the first substrate which faces the second substrate, and the wiring line is provided between the second insulating film and the third insulating film in the non-display area.

According to the invention, the common potential line and the wiring lines are, for example, aluminum wiring lines.

The liquid crystal device according to the invention can be used in an electronic apparatus such as a cellular phone, a mobile computer, a finder of a camera, and a projection displaying device. Among the electronic apparatuses, the projection displaying device includes a light source portion for supplying light to a liquid crystal device and a projection optical system that projects light modulated by the liquid crystal device.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1A:
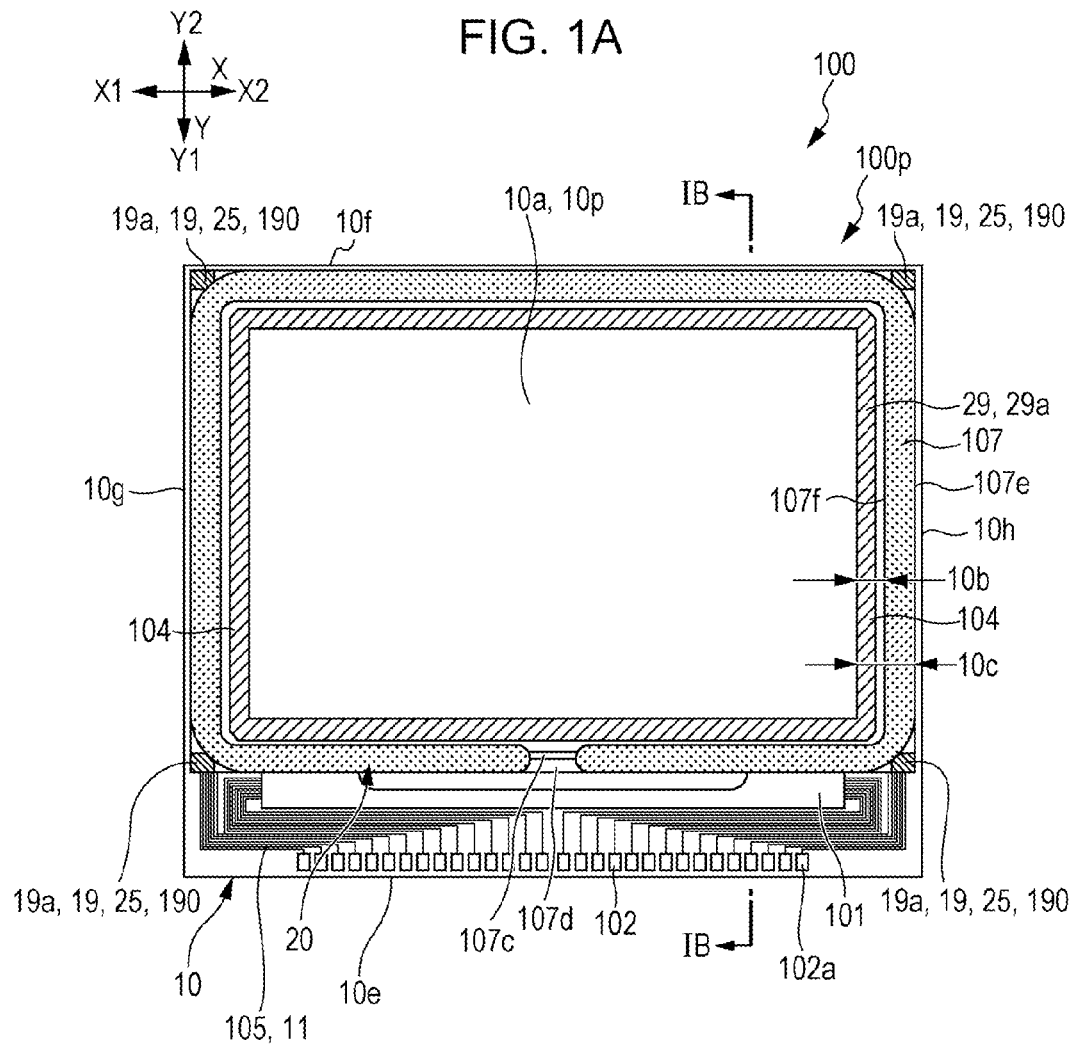
FIGS. 1A and 1B are explanatory diagrams of a liquid crystal panel of a liquid crystal device to which the invention is applied.

With reference to the drawings, exemplary embodiments of the invention are described. In addition, in the drawings referred to in the descriptions below, in order to cause respective layers and respective portions to be recognizable in the drawings, dimensions of the respective layers and the respective portions are differentiated. In addition, in the drawings referred to in the descriptions, wiring lines such as scanning lines, data lines, and signal lines, fewer lines are illustrated. In addition, two directions intersecting in an in-plane direction of a first substrate 10 are described as a Y direction (first direction) and an X direction (second direction), one side in the Y direction is described as a Y1 side, the other side in the Y direction is described as a Y2 side, one side in the X direction is described as an X1 side, and the other side in the X direction is described as an X2 side.

Entire Configuration

Figure 1B:
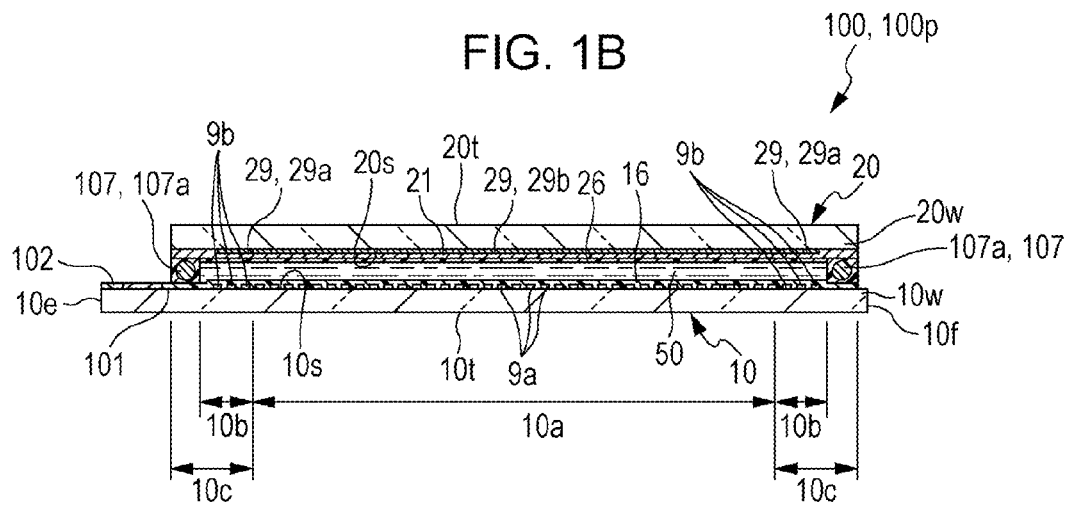

FIGS. 1A and 1B are explanatory diagrams of a liquid crystal panel of a liquid crystal device to which the invention is applied, FIG. 1A is a plan view of a liquid crystal panel together with respective components seen from a counter substrate side, and FIG. 1B is a sectional view of the liquid crystal panel taken along the line IH-IH'.

As illustrated in FIGS. 1A and 1B, in a liquid crystal device 100 of the invention, a liquid crystal panel 100p is formed by sticking the first substrate 10 (element substrate) and a second substrate 20 (counter substrate) to a frame-shaped seal material 107 via a predetermined gap, and the seal material 107 is provided in a frame shape along the outer edge of the second substrate 20. The seal material 107 is a bonding agent made of a photo-curing resin, a thermo-setting resin, and the like, and a gap material 107a such as glass fiber or glass beads for causing a distance between both substrates to be a predetermined value is combined. In the liquid crystal panel 100p, a liquid crystal layer 50 is provided in an area which is between the first substrate 10 and the second substrate 20 and surrounded by the seal material 107. A discontinued section which is used as a liquid crystal injection opening 107c is formed in the seal material 107, and the liquid crystal injection opening 107c is sealed with a sealing material 107d, after a liquid crystal material is injected.

In the liquid crystal panel 100p, the first substrate 10 and the second substrate 20 are all tetragons, and the first substrate 10 includes two sides 10e and 10f (end portions) that face each other in the Y direction (first direction) and two sides 10g and 10h (end portions) that face each other in the X direction (second direction). A display area 10a is provided as a tetragonal area in the substantial center of the liquid crystal panel 100p, and according to the shape, the seal material 107 is also provided as a substantial tetragon. Accordingly, the liquid crystal panel 100p has a tetragonal non-display area 10c between the display area 10a and an outer edge 107e of the seal material 107 (outer edge of the second substrate 20).

In the non-display area 10c of the first substrate 10, a data line driving circuit 101 and plural connecting terminals 102 are formed along the side 10e positioned on one side Y1 of the first substrate 10 in the Y direction, and scanning line driving circuits 104 are formed respectively along the other sides 10g and 10h neighboring the side 10e. In addition, a flexible wiring substrate (not illustrated) is connected to the connecting terminals 102, and various potentials and various signals are input from an external control circuit to the first substrate 10 via the flexible wiring substrate.

Details thereof are described below with reference to FIG. 3, but, among one surface 10s and the other surface 10t of the first substrate 10, on the one surface 10s side facing the second substrate 20, pixel electrodes 9a and pixel switching elements 30 described below with reference to FIG. 2 and the like are arranged in the display area 10a in a matrix shape. Accordingly, the display area 10a is configured as a pixel electrode array area 10p in which the pixel electrodes 9a are arranged in a matrix shape. In the first substrate 10 having the configuration, an alignment film 16 is formed on the upper layer side of the pixel electrodes 9a.

On the one surface 10s side of the first substrate 10, in the non-display area 10c on the external side of the display area 10a, dummy pixel electrodes 9b are formed in a tetragonal frame-shaped dummy area 10b (peripheral area) interposed between the display area 10a and the seal material 107.

Among one surface 20s and the other surface 20t of the second substrate 20, common electrodes 21 are formed on the one surface 20s side facing the first substrate 10. The common electrodes 21 are formed on substantially the entire surface of the second substrate 20 or throughout plural pixels 100a as belt-shaped electrodes. According to the exemplary embodiment, the common electrodes 21 are formed on substantially the entire surface of the second substrate 20.

With respect to the one surface 20s side of the second substrate 20, a light shielding layer 29 is formed on the lower layer side of the common electrodes 21, and an alignment film 26 is stacked on the surface of the common electrodes 21. The light shielding layer 29 is formed as a frame section 29a extending along an outer circumferential edge of the display area 10a, and the display area 10a is regulated by an inner circumferential edge of the light shielding layer 29. In addition, the light shielding layer 29 is formed as a black matrix portion 29b overlapped with an interpixel area interposed between the neighboring pixel electrodes 9a.

In the liquid crystal panel 100p, on the outer side of the seal material 107, substrate conducting electrodes 25 are formed on four angle sections of the one surface 20s side of the second substrate 20, and substrate conducting electrodes 19 are formed at positions facing four angle sections of the second substrate 20 (the substrate conducting electrodes 25) on the one surface 10s side of the first substrate 10. According to the exemplary embodiment, the substrate conducting electrodes 25 are formed with portions of the common electrodes 21. A constant potential Vcom is applied to the substrate conducting electrodes 19. A substrate conducting material 19a including conductive particles is disposed between the substrate conducting electrodes 19 and the substrate conducting electrodes 25, and the common electrodes 21 of the second substrate 20 are electrically connected to the first substrate 10 side via a substrate conducting portion 190 formed with the substrate conducting electrodes 19, the substrate conducting material 19a, and the substrate conducting electrodes 25. Therefore, the constant potential Vcom is applied from the first substrate 10 side to the common electrodes 21. The seal material 107 is provided along an outer circumferential edge of the second substrate 20 in substantially the same width dimension. However, in the area overlapped with the angle section of the second substrate 20, the seal material 107 is provided to avoid the substrate conducting electrodes 19 and 25 and passes through the inner side.

According to the exemplary embodiment, the liquid crystal device 100 is a transmissive liquid crystal device, and the pixel electrodes 9a and the common electrodes 21 are formed with translucent conductive films such as an indium tin oxide (ITO) film or an indium zinc oxide (IZO) film. In the transmissive liquid crystal device 100, while light incident from the second substrate 20 side is emitted from the first substrate 10 side, the light is modulated and displays an image. In addition, if the liquid crystal device 100 is a reflection-type liquid crystal device, the common electrodes 21 are formed with a translucent conductive film such as an ITO film or an IZO film, and the pixel electrodes 9a are formed with a reflective conductive film such as an aluminum film. In the reflection-type liquid crystal device 100, among the first substrate 10 and the second substrate 20, while light incident from the second substrate 20 side is reflected on the first substrate 10 and emitted, the light is modulated and displays an image.

The liquid crystal device 100 can be used as a color display device of an electronic apparatus such as a mobile computer or a mobile phone. In this case, a color filter (not illustrated) is formed on the second substrate 20 or the like. In addition, the liquid crystal device 100 can be used as electronic paper. In addition, in the liquid crystal device 100, according to the kind of liquid crystal layer 50 used or according to modes: a normally white mode or a normally black mode, a polarization film, a phase difference film, a polarization plate, and the like are disposed to the liquid crystal panel 100p in a predetermined direction. In addition, in a projection displaying device (liquid crystal projector) described below, the liquid crystal devices 100 can be used as light valves for RGB. In this case, with respect to the respective liquid crystal devices 100 for RGB, since respective colors of light separated via dichroic mirrors for RGB color separation are respectively incident as projection light, no color filters are formed.

Electrical Configuration of the First Substrate 10

Figure 2A:
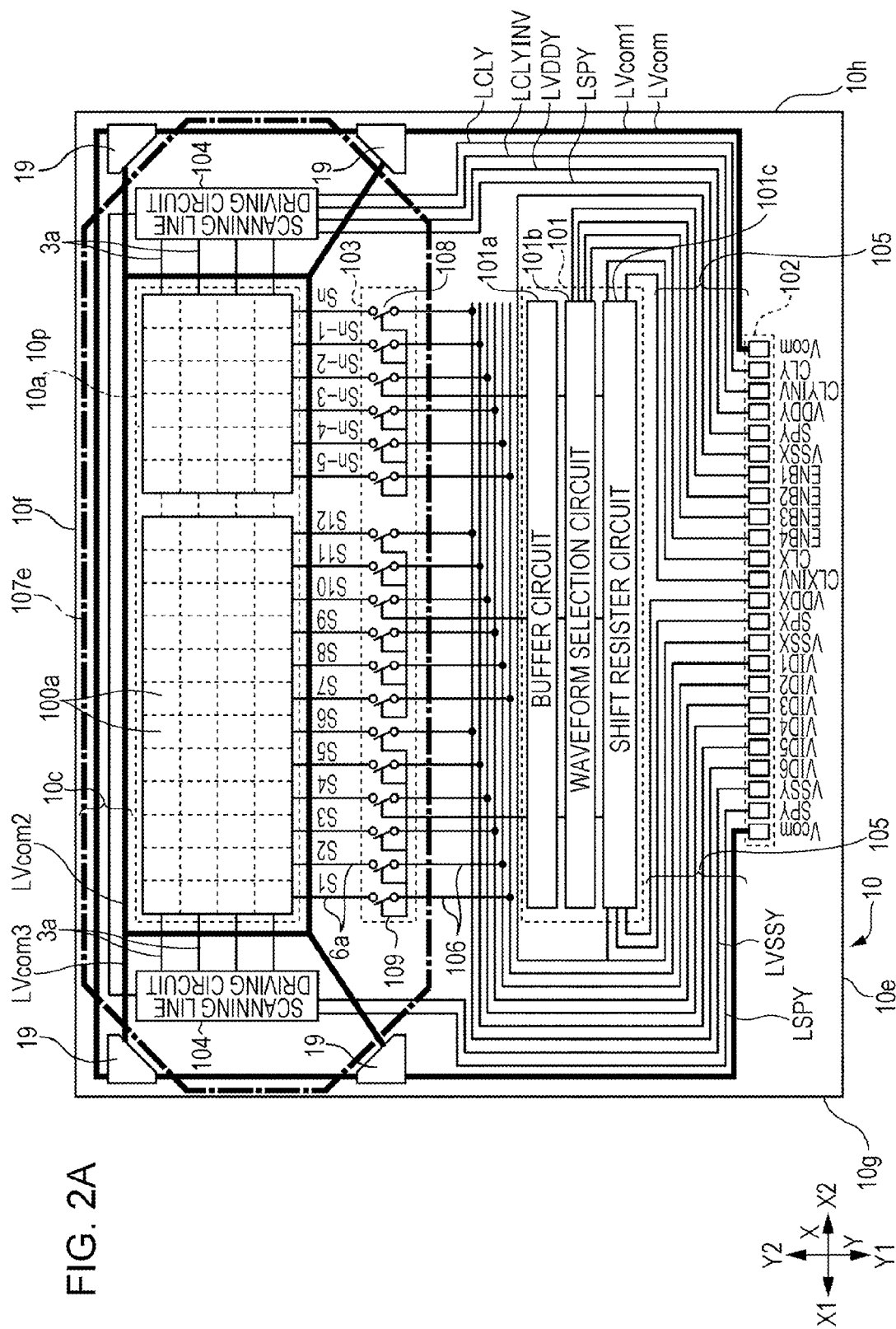
FIGS. 2A and 2B are explanatory diagrams of an electrical configuration of a first substrate to which the invention is applied.
Figure 2B:
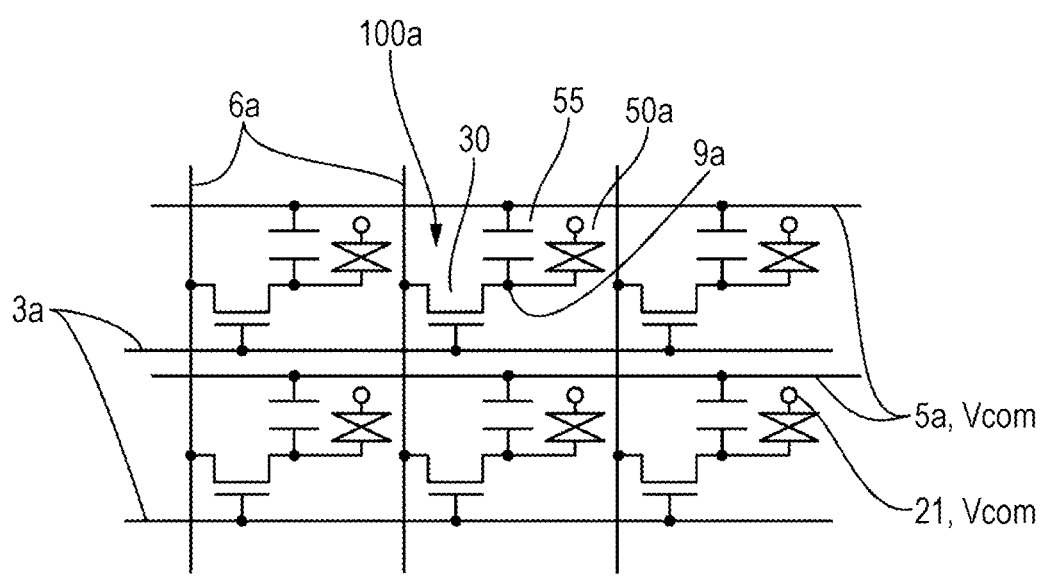

FIGS. 2A and 2B are explanatory diagrams of an electrical configuration of the first substrate 10 of the liquid crystal device 100 to which the invention is applied, in which FIG. 2A is an explanatory diagram of a flat layout of circuits or wiring lines of the first substrate 10, and FIG. 2B is an explanatory diagram of an electrical configuration of pixels. In addition, in FIGS. 2A and 2B, the outer edge 107e of the seal material 107 is illustrated with an alternate long and short dashed line, and common potential lines LVcom are illustrated with heavy lines. In addition, in FIG. 2, with respect to the dummy area 10b formed in the Y direction of the display area 10a, the illustration of the pixels 100a is omitted. In addition, according to the description below, wiring lines corresponding to signals or potentials input to the first substrate 10 via the connecting terminals 102 is described by applying alphabet symbols indicating the signals or the potentials after "L". For example, the wiring line corresponding to a "clock signal CLX" which is a name of a signal is called a "clock signal line LCLX". In addition, the connecting terminals 102 are described by applying alphabet symbols indicating the signals or the potentials after "T". For example, the connecting terminal 102 corresponding to the "clock signal CLX" which is the name of the signal is called a "connecting terminal TCLX".

As illustrated in FIGS. 2A and 2B, with respect to the liquid crystal device 100, the pixel electrode array area 10p in which the plural pixels 100a are arranged in the matrix shape is provided on the first substrate 10. In the pixel electrode array area 10p, an area surrounded by the inner edge of the frame section 29a illustrated in FIG. 1B is the display area 10a and an area on the outer side of the display area 10a is the dummy area 10b.

In the first substrate 10, plural data lines 6a extending in the Y direction (first direction) and plural scanning lines 3a extending in the X direction (second direction) are formed on the inner side of the pixel electrode array area 10p, and at positions corresponding to intersection points thereof, the pixels 100a are formed. In each of the plural pixels 100a, the pixel switching element 30 including a transistor such as TFT and the pixel electrode 9a are formed. The data line 6a is electrically connected to the source of the pixel switching element 30, the scanning line 3a is electrically connected to the gate of the pixel switching element 30, and the pixel electrode 9a is electrically connected to the drain of the pixel switching element 30.

In the first substrate 10, the scanning line driving circuits 104, the data line driving circuit 101, a sampling circuit 103, the substrate conducting electrodes 19, and the connecting terminals 102 are formed in the non-display area 10c on the outer side of the display area 10a (the pixel electrode array area 10p), wiring lines 105 extend from the connecting terminals 102 to the scanning line driving circuits 104, the data line driving circuit 101, the sampling circuit 103, and the substrate conducting electrodes 19. The sampling circuit 103 is electrically connected to the plural data lines 6a on one side Y1 in the Y direction, and the scanning line driving circuit 104 is electrically connected to the plural scanning lines 3a in the X direction.

In each pixel 100a, the pixel electrode 9a faces the common electrode 21 formed on the second substrate 20 described with reference to FIG. 1 via the liquid crystal layer 50, and configures a liquid crystal capacitor 50a. In addition, in the pixel 100a, in order to prevent the fluctuation of an image signal stored in the liquid crystal capacitor 50a, a storage capacitor 55 is added in parallel to the liquid crystal capacitor 50a. According to the exemplary embodiment, in order to form the storage capacitor 55, capacitor lines 5a are formed throughout the plural pixels 100a, and the constant potential Vcom which is common to the common potential applied to the common electrodes 21 is applied to the capacitor lines 5a. In addition, the capacitor lines 5a may employ the configuration of extending in the X direction along the scanning lines 3a and the configuration of extending in the Y direction along the data lines 6a.

The connecting terminals 102 are formed by plural connecting terminal groups which are largely divided by four uses: a group for a common potential line, a group for a scanning line driving circuit, a group for an image signal, and a group for a data line driving circuit. Specifically, the plural connecting terminals 102 include connecting terminals TVcom as terminals for the common potential lines LVcom, and include connecting terminals TSPY, connecting terminals TVSSY, connecting terminals TVDDY, connecting terminals TCLY, and connecting terminals TCLYINV as terminals for the scanning line driving circuits 104. In addition, the plural connecting terminals 102 include connecting terminals TVID1 to TVID6 as terminals for image signals VID1 to VID6, and include connecting terminals TVSSX, connecting terminals TSPX, connecting terminals TVDDX, connecting terminal TCLX, connecting terminal TCLXINV, connecting terminals TENB1 to TENB4, and the connecting terminals TVSSX, as terminals for the data line driving circuit 101.

The data line driving circuit 101 includes a shift register circuit 101c, a waveform selecting circuit 101b, and a buffer circuit 101a. In the data line driving circuit 101, the shift register circuit 101c uses a negative power supply VSSX and a positive power supply VDDX supplied from the external control circuit via the connecting terminals 102 (the connecting terminals TVSSX and TVDDX) and the wiring lines 105 (wiring lines LVSSX and LVDDX) as a power supply, and starts a transmission operation based on a start signal SPX supplied from the external control circuit via the connecting terminals 102 (the connecting terminals TSPX) and the wiring line 105 (wiring line LSPX). The shift register circuit 101c outputs a transmission signal to the waveform selecting circuit 101b based on the clock signal CLX and the opposite phase clock signal CLXINV via the connecting terminals 102 (the connecting terminals TCLX and TCLXINV) and the wiring lines 105 (wiring lines LCLX and LCLXINV). The waveform selecting circuit 101b is also called an "enable circuit", and regulates sampling periods in the sampling circuit 103 described below, by restricting pulse widths of transmission signals output from the shift register circuit 101c to pulse widths of enable signals ENB1 to ENB4 supplied from the external control circuit via the connecting terminals 102 (the connecting terminals TENB1 to TENB4) and the wiring lines 105 (wiring lines LENB1 to LENB4). More specifically, the waveform selecting circuit 101b includes a NAND circuit, an inverter, and the like provided corresponding to respective stages of the shift register circuit 101c, and performs potential selecting control on a time axis so that the data lines 6a are driven only when a transmission signal output from the shift register circuit 101c is in a high level and any one of the enable signals ENB1 to ENB4 is in a high level. The buffer circuit 101a buffers the transmission signal in which waveform selection is performed in this manner, and then supplies the transmission signal to the sampling circuit 103 via a sampling circuit driving signal line 109 as a sampling circuit driving signal.

The sampling circuit 103 includes plural sampling switches 108 for sampling image signals. According to the exemplary embodiment, the sampling switches 108 include transistors such as TFT. The data line 6a is electrically connected to drains of the sampling switches 108, the wiring lines 105 (image signal lines LVID1 to LVID6) is connected to sources of the sampling switches 108 via wiring lines 106, and the sampling circuit driving signal lines 109 connected to the data line driving circuit 101 are connected to gates of the sampling switches 108. Also, the image signals VID1 to VID6 supplied to the wiring lines 105 (the image signal lines LVID1 to LVID6) via the connecting terminals 102 (connecting terminals TVID1 to VID6) are sampled by the sampling circuit 103 according to the supply of the sampling circuit driving signals from the data line driving circuit 101 via the sampling circuit driving signal lines 109, and are supplied to the respective data lines 6a as image signals S1 to Sn. According to the exemplary embodiment, the image signals S1 to Sn are supplied to sets of six data lines 6a group by group according to the respective image signals VID1 to VID6 which are subjected serial-parallel expansion to 6 phases. In addition, the number of the phase expansion of the image signals is not limited to 6 phases, the image signals expanded to plural phases such as 9 phases, 12 phases, 24 phases, and 48 phases are supplied to sets of the data lines 6a in which data lines in the number corresponding to the number of the phase expansion are one set.

The scanning line driving circuit 104 includes a shift register circuit and a buffer circuit as components. The scanning line driving circuit 104 uses a negative power supply VSSY and a positive power supply VDDY supplied from the external control circuit via the connecting terminals 102 (the connecting terminals TVSSY and TVDDY) and the wiring lines 105 (wiring lines LVSSY and LVDDY), as power supplies, and starts a transmission operation of a built-in shift register circuit thereof, corresponding to a start signal SPY supplied from the external control circuit via the connecting terminals 102 (the connecting terminals TSPY) and the wiring lines 105 (wiring lines LSPY). In addition, the scanning line driving circuit 104 sequentially applies scanning signals to the scanning lines 3a at a predetermined timing based on a clock signal CLY and an opposite phase clock signal CLYINV via the connecting terminals 102 (the connecting terminals TCLY and TCLYINV) and the wiring lines 105 (wiring lines LCLY and LCLYINV).

The wiring 105 (the common potential lines LVcom) is formed on the first substrate 10 so as to pass through the four substrate conducting electrodes 19, and the constant potential Vcom is supplied to the substrate conducting electrodes 19 via the connecting terminals 102 (the connecting terminals TVcom) and the wiring lines 105 (the common potential lines LVcom).

Specific Configuration of the Pixels 100a

Figure 3A:
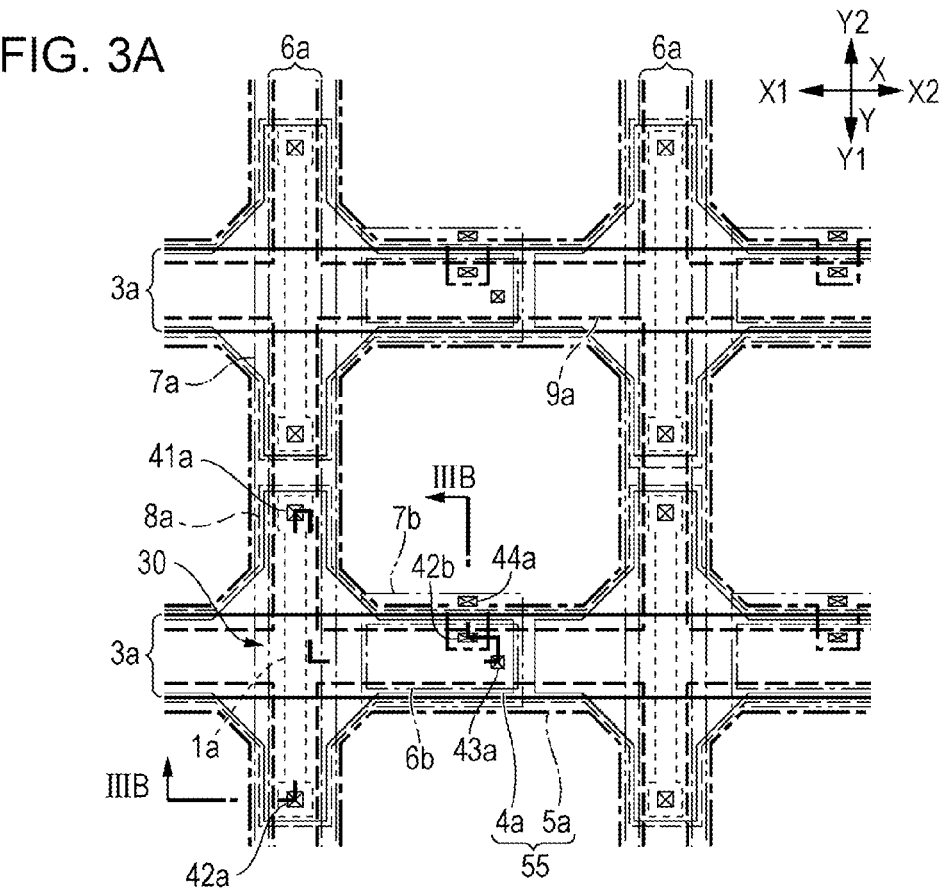
FIGS. 3A to 3B are explanatory diagrams of pixels of the liquid crystal device to which the invention is applied.
Figure 3B:
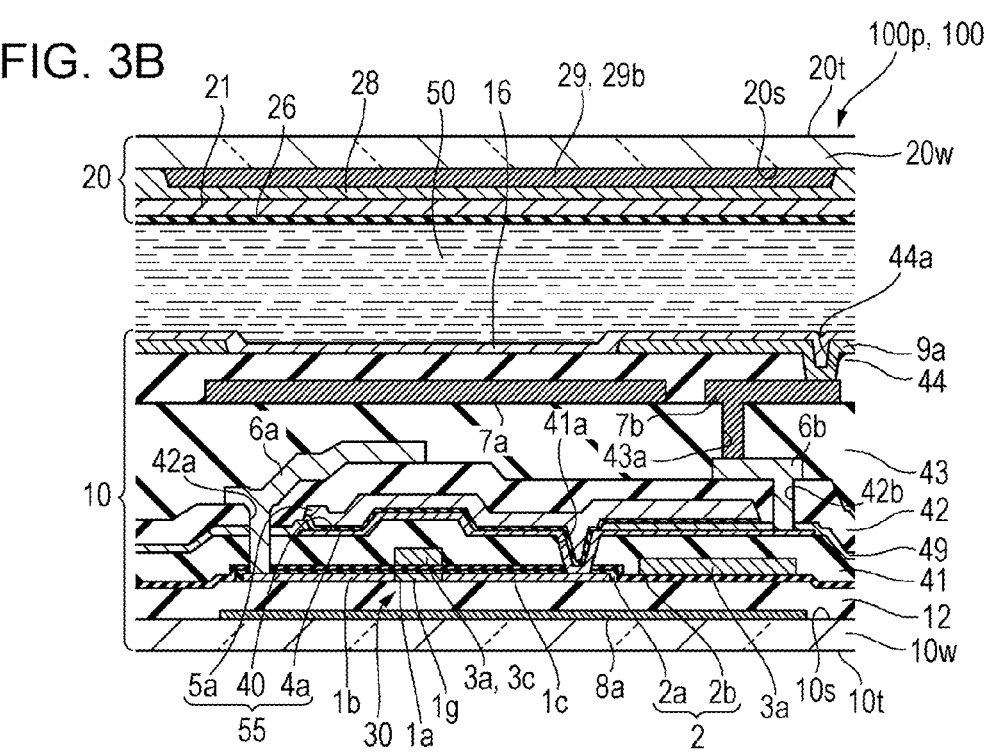

FIGS. 3A to 3B are explanatory diagrams of the pixels 100a of the liquid crystal device 100 to which the invention is applied, in which FIG. 3A is a plan view of plural pixels adjacent to each other on the first substrate 10 and FIG. 3B is a sectional view of the liquid crystal device 100 taken along line IIIH-IIIH'. In addition, in FIG. 3A, respective layers are illustrated with the following lines:

light shielding layer 8a on lower layer side=thin and long broken lines,
semiconductor layer 1a=thin and short dotted line,
scanning line 3a=thick solid line,
drain electrode 4a=thin solid line,
data line 6a and relay electrode 6b=thin alternate long and short dashed line,
capacitor line 5a=thick long and short dashed line,
light shielding layer 7a and relay electrode 7b on upper layer side=thin alternate long and two short dashed line,
and pixel electrode 9a=thick broken line. In addition, in FIG. 3A, with respect to the layers of which the end portions thereof are overlapped with each other in the planar view, the positions of the end portions are deviated so that the shapes of the layers can be easily understood. In addition, when layers formed on the first substrate 10 are described, the upper layer side means an opposite side of a substrate main body 10w (the second substrate 20 side and the liquid crystal layer 50 side), and the lower layer side means the substrate main body 10w side (opposite side of the second substrate 20 and opposite side of the liquid crystal layer 50). In addition, when films formed on the second substrate 20 are described, the upper layer side means the opposite side of a substrate main body 20w (the first substrate 10 side and the liquid crystal layer 50 side), and the lower layer side means the substrate main body 20w side (the opposite side of the first substrate 10 and the opposite side of the liquid crystal layer 50).

As illustrated in FIG. 3A, on the one surface 10s facing the second substrate 20 in the first substrate 10, the pixel electrodes 9a are formed respectively in the plural pixels 100a, and the data lines 6a and the scanning lines 3a are formed along the interpixel areas interposed between the pixel electrodes 9a adjacent to each other. According to the exemplary embodiment, the interpixel areas vertically and horizontally extend. Among the interpixel areas, the scanning lines 3a linearly extend along first interpixel areas extending in the X direction, and the data lines 6a linearly extend along second interpixel areas in the Y direction. In addition, the pixel switching elements 30 are formed according to intersections of the data lines 6a and the scanning lines 3a, and according to the exemplary embodiment, the pixel switching elements 30 are formed by using intersection areas of the data lines 6a and the scanning lines 3a and the vicinity thereof. The capacitor lines 5a are formed on the first substrate 10, and the constant potential Vcom is applied to the capacitor lines 5a. According to the exemplary embodiment, the capacitor lines 5a extend so as to be overlapped with the scanning lines 3a and the data lines 6a and are formed in a grid shape. The light shielding layer 7a is formed on the upper layer side of the pixel switching elements 30, and the light shielding layer 7a extends so as to be overlapped with the data lines 6a. The light shielding layer 8a is formed on the lower layer side of the pixel switching elements 30, and the light shielding layer 8a includes main line sections linearly extending so as to be overlapped with the scanning lines 3a and extending sub line sections extending so as to be overlapped with the data lines 6a at the intersections of the data lines 6a and the scanning lines 3a.

As illustrated in FIG. 3B, the first substrate 10 includes the pixel electrodes 9a, the pixel switching elements 30 for switching pixels, the alignment film 16, and the like on the substrate surface (on the one surface 10s facing the second substrate 20) on the liquid crystal layer 50 side of the transparent substrate main body 10w such as a quartz substrate or a glass substrate. The second substrate 20 includes the light shielding layer 29, the common electrodes 21, and the alignment film 26 on the substrate surface (the one surface 20s facing the first substrate 10) on the liquid crystal layer 50 side of the transparent substrate main body 20w such as the quartz substrate or the glass substrate.

Specifically, with respect to the first substrate 10, the light shielding layer 8a is formed on the lower layer side made of conductive films such as a conductive polysilicon film, a metal silicide film, a metal film, or a metal compound film on the one surface 10s side of the substrate main body 10w. According to the exemplary embodiment, the light shielding layer 8a is formed of a light shielding film such as tungsten silicide (WSi), and when the light after passing through the liquid crystal device 100 is reflected on other members, the reflected light prevents the generation of the malfunction caused by the photocurrent in the pixel switching elements 30 incident to the semiconductor layers 1a. In addition, there is a case in which the light shielding layer 8a is configured as a scanning line, and in this case, a gate electrode 3b described below and the light shielding layer 8a are brought into conduction with each other.

On the one surface 10s side of the substrate main body 10w, a transparent insulating film 12 such as a silicon oxide film is formed on the upper layer side of the light shielding layer 8a, and the pixel switching elements 30 including the semiconductor layers 1a are formed on the surface side of the insulating film 12. The pixel switching elements 30 include the semiconductor layers 1a of which the long side direction directs in the extending direction of the data line 6a, and the gate electrode 3b that extends in the direction orthogonal to the length direction of the semiconductor layers 1a and which is overlapped with the central section of the semiconductor layers 1a in the longitudinal direction, and according to the exemplary embodiment, the gate electrode 3b is formed in a portion of the scanning lines 3a. The pixel switching element 30 includes a transparent gate insulating layer 2 between the semiconductor layers 1a and the gate electrode 3b. The semiconductor layer 1a includes a channel area 1g facing the gate electrode 3b via the gate insulating layer 2, and includes a source area 1b and a drain area 1c on both sides of the channel area 1g. According to the exemplary embodiment, the pixel switching element 30 has an LDD structure. Accordingly, the source area 1b and the drain area 1c respectively include low concentration areas on both sides of the channel areas 1g, and include high concentration areas on the areas adjacent to the low concentration areas on the opposite side of the channel areas 1g.

The semiconductor layer 1a is formed of a polysilicon film (polycrystalline silicon film), or the like. The gate insulating layer 2 includes a first gate insulating layer 2a formed of a silicon oxide film obtained by being thermally oxidized by the semiconductor layer 1a and a second gate insulating layer 2b made of a silicon oxide film formed by a decompression CVD method. The gate electrode 3b and the scanning lines 3a are made of conductive films such as conductive polysilicon films, metal silicide films, metal films, or metal compound films.

A transparent interlayer insulating film 41 made of a silicon oxide film such as NSG, PSG, BSG, and BPSG is formed on the upper layer side of the gate electrode 3b. The drain electrode 4a is formed on the upper layer of the interlayer insulating film 41. The drain electrode 4a is made of a conductive film such as a conductive polysilicon film, a metal silicide film, a metal film, or a metal compound film. The drain electrode 4a is formed so that a portion thereof is overlapped with the drain area 1c of the semiconductor layers 1a (source/drain area on pixel electrode side), is conducted to the drain area 1c via a contact hole 41a penetrating the interlayer insulating film 41 and the gate insulating layer 2.

A transparent insulating film 49 made of a silicon oxide film and a transparent dielectric layer 40 are on the upper layer side of the drain electrode 4a, and the capacitor line 5a is formed on the upper layer side of the dielectric layer 40. As the dielectric layer 40, a silicon compound such as a silicon oxide film or a silicon nitride film can used, and also a high dielectric constant dielectric layer such as an aluminum oxide film, a titanium oxide film, a tantalum oxide film, a niobium oxide film, a hafnium oxide film, a lanthanum oxide film, and a zirconium oxide film can be used. The capacitor line 5a is made of a conductive film such as a conductive polysilicon film, a metal silicide film, a metal film, or a metal compound film. Here, the capacitor line 5a is overlapped with the drain electrode 4a via the dielectric layer 40, so as to form the storage capacitor 55.

A transparent interlayer insulating film 42 made of a silicon oxide film is formed on the upper layer side of the capacitor line 5a, and the data line 6a and the relay electrode 6b are formed of the same conductive film, on the upper layer side of the interlayer insulating film 42. The data line 6a and the relay electrode 6b are formed of conductive films such as conductive polysilicon films, metal silicide films, metal films, and metal compound films. According to the exemplary embodiment, the data line 6a and the relay electrode 6b are made of aluminum. In addition, the data line 6a and the relay electrode 6b are made of aluminum layers and titanium nitride layers stacked on the aluminum layers. The data line 6a is conducted to the source area 1b (source/drain area on the data line side) via a contact hole 42a penetrating the interlayer insulating film 42, the insulating film 49, the interlayer insulating film 41, and the gate insulating layer 2. The relay electrode 6b is conducted to the drain electrode 4a via a contact hole 42b penetrating the interlayer insulating film 42 and the insulating film 49.

The transparent interlayer insulating film 43 made of a silicon oxide film is formed on the upper layer side of the data line 6a and the relay electrode 6b. The light shielding layer 7a and the relay electrode 7b are formed of the same conductive film on the upper layer side of the interlayer insulating film 43. The surface of the interlayer insulating film 43 is planarized. The light shielding layer 7a and the relay electrode 7b are made of conductive films such as conductive polysilicon films, metal silicide films, metal films, or metal compound films. According to the exemplary embodiment, the light shielding layer 7a and the relay electrode 7b are made of aluminum. In addition, according to the exemplary embodiment, the light shielding layer 7a and the relay electrode 7b are made of aluminum layers and titanium nitride layers stacked on the upper layer of the aluminum layers. The relay electrode 7b is conducted to the relay electrode 6b via a contact hole 43a penetrating the interlayer insulating film 43. The light shielding layer 7a extends so as to be overlapped with the data line 6a. In addition, the light shielding layer 7a is brought into conduction with the capacitor lines 5a, and may be used as a shield layer.

The transparent interlayer insulating film 44 made of a silicon oxide film or the like is formed on the upper layer side of the light shielding layer 7a and the relay electrode 7b. The pixel electrode 9a made of the ITO film or the like is formed on the upper layer side of the interlayer insulating film 44. A contact hole 44a that penetrates the interlayer insulating film 44 and reaches the relay electrode 7b is formed in the interlayer insulating film 44, and the pixel electrode 9a is electrically connected to the relay electrode 7b via the contact hole 44a. As a result, the pixel electrode 9a is electrically connected to the drain area 1c via the relay electrode 7b, the relay electrode 6b, and the drain electrode 4a. The surface of the interlayer insulating film 44 is planarized.

The alignment film 16 made of a polyimide or inorganic alignment film is formed on the surface side of the pixel electrodes 9a. According to the exemplary embodiment, the alignment film 16 is formed of diagonally vapor-deposited film (obliquely and vertically alignment film/inorganic alignment film) such as SiOx (x<2), $SiO_2$, $TiO_2$, MgO, $Al_2O_3$, $In_2O_3$, $Sb_2O_3$, and $Ta_2O_5$.

In addition, switching elements used in the data line driving circuit 101 or the scanning line driving circuits 104 illustrated in FIGS. 1A and 1B or the sampling switches 108 illustrated in FIGS. 2A and 2B have substantially the same configuration as the pixel switching elements 30.

Configuration of the Second Substrate 20

In the second substrate 20, the light shielding layer 29, an insulating film 28 made of a silicon oxide film or the like, and the common electrode 21 made of a translucent conductive film such as the ITO film are formed on the surface (the one surface 20s facing the first substrate 10) on the liquid crystal layer 50 side of the transparent substrate main body 20w (transparent substrate) such as a quartz substrate or glass substrate, and the alignment film 26 made of a polyimide or inorganic alignment film is formed so as to cover the common electrode 21. According to the exemplary embodiment, the common electrode 21 is made of the ITO film. According to the exemplary embodiment, the alignment film 26 is a diagonally vapor-deposited film (oblique and vertical alignment film/inorganic alignment film) such as SiOx (x<2), $SiO_2$, $TiO_2$, MgO, $Al_2O_3$, $In_2O_3$, $Sb_2O_3$, and $Ta_2O_5$, in the same manner as the alignment film 16. The alignment films 16 and 26 obliquely and vertically align nematic liquid crystal compounds of which dielectric anisotropy is negative and which are used in the liquid crystal layer 50, and the liquid crystal panel 100p operates as a VA mode which is normally black. According to the exemplary embodiment, as the alignment films 16 and 26, diagonally vapor-deposited films of silicon oxide films (SiOx) are used among various kinds of inorganic alignment films.

Layout of a Constant Potential Line LCcom or the Like

Figure 4A:
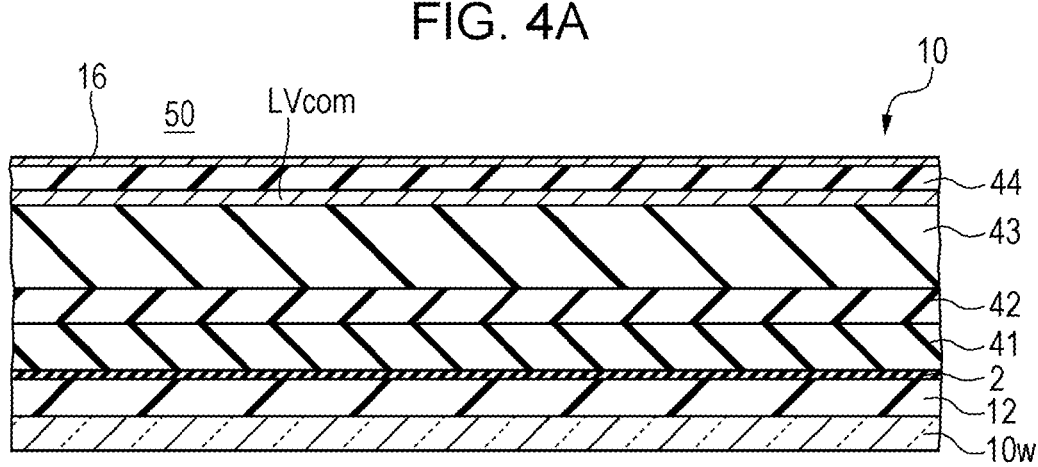
FIGS. 4A to 4C are explanatory diagrams of wiring lines of the liquid crystal device to which the invention is applied.
Figure 4B:
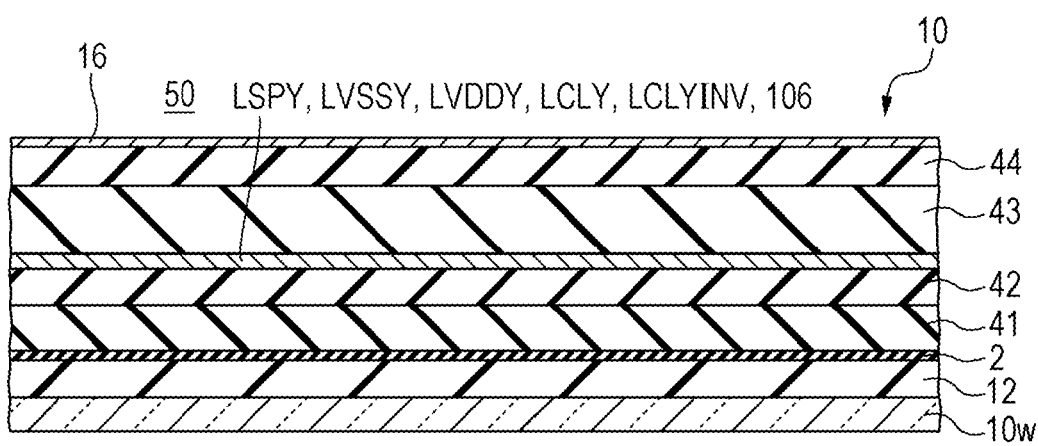
Figure 4C:
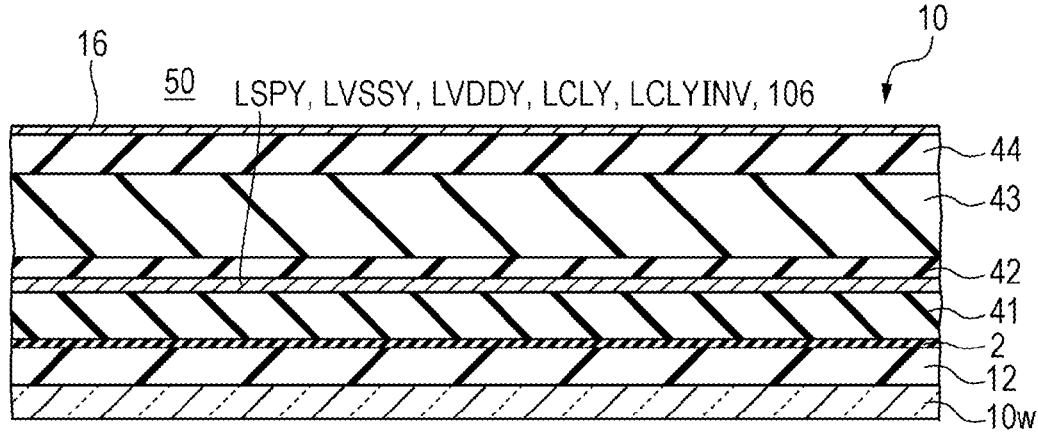

FIGS. 4A to 4C are explanatory diagrams of wiring lines of the liquid crystal device 100 to which the invention is applied, in which FIG. 4A is a sectional view of the common potential lines LVcom, FIG. 4B is a sectional view of wiring lines that supplies a potential different from the common potential, and FIG. 4C is a sectional view of a modification example of the wiring lines that supplies a potential different from the common potential.

Further, in FIG. 2, the connecting terminals TVcom are disposed in end portions on both sides of the areas in which the connecting terminals 102 are arranged, and the common potential lines LVcom have first wiring line sections LVcom1 that extend from two connecting terminals TVcom along the outer edge of the first substrate 10 and extend toward the four substrate conducting electrodes 19. In addition, the common potential lines LVcom include second wiring line sections LVcom2 that extend along the display area 10a so as to surround the entire circumference of the display area 10a in the non-display area 10c, and third wiring line sections LVcom3 that respectively connect the second wiring line sections and the four substrate conducting electrodes 19. According to the exemplary embodiment, the second wiring line sections LVcom2 extend in the dummy area 10b interposed between an inner edge 107f of the seal material 107 and the display area 10a in the non-display area 10c.

In addition, as wiring lines that supplies a potential different from a common potential Vcom, a portion of wiring lines LSPY, LVSSY, LVDDY, LCLY, and LCLYINV that connects the connecting terminals TSPY, TVSSY, TVDDY, TCLY, and TCLYINV and the scanning line driving circuits 104, and a portion of the wiring lines 106 connected to the sources of the sampling switches 108 extends in the non-display area 10c.

Here, as illustrated in FIG. 4A, the common potential lines LVcom are provided between an interlayer insulating film 43 and an interlayer insulating film 44, as aluminum wiring lines on the same layer of a light shielding layer 7a or a relay electrode 7b, and the pixel electrodes 9a are provided on the upper layer of the interlayer insulating film 44. In the liquid crystal device 100 according to the exemplary embodiment, the interlayer insulating film 44 (first insulating film), the interlayer insulating film 43 (second insulating film), the interlayer insulating film 42 (third insulating film), and the interlayer insulating film 41 (fourth insulating film) are provided sequentially from the liquid crystal layer 50 side, and the common potential lines LVcom are provided between the interlayer insulating film 43 (second insulating film) and the interlayer insulating film 44 (first insulating film). Therefore, among various kinds of wiring lines, the common potential lines LVcom are provided in positions nearest from the liquid crystal layer 50.

In contrast, as illustrated in FIG. 4B, the wiring lines LSPY, LVSSY, LVDDY, LCLY, and LCLYINV, and the wiring lines 106 are provided between the interlayer insulating film 42 (third insulating film) and the interlayer insulating film 43 (second insulating film), as aluminum wiring lines on the same layer of the data lines 6a and the relay electrode 6b. Here, as illustrated in FIG. 4C, the wiring lines LSPY, LVSSY, LVDDY, LCLY, and LCLYINV, and the wiring lines 106 are provided between the interlayer insulating film 41 (fourth insulating film) and the interlayer insulating film 42 (third insulating film) on the same layer of the capacitor lines 5a. In all cases, the wiring lines LSPY, LVSSY, LVDDY, LCLY, and LCLYINV, and the wiring lines 106 are provided in positions farthest from the common potential lines LVcom, when seen from the liquid crystal layer 50. In addition, in the non-display area 10c, as wiring lines that supplies a potential different from the common potential Vcom, the data lines 6a and the scanning lines 3a also extend. However, the data lines 6a are provided between the interlayer insulating film 42 (third insulating film) and the interlayer insulating film 43 (second insulating film), and the scanning lines 3a are provided between the interlayer insulating film 41 and the substrate main body 10w.

Main Advantage of the Exemplary Embodiment

As described above, in the liquid crystal device 100 according to the exemplary embodiment, among wiring lines extending in the non-display area 10c interposed between the display area 10a and the outer edge 107e of the seal material 107, the common potential lines LVcom are provided between the pixel electrodes 9a via the interlayer insulating film 44 (first insulating film). On the contrary, the wiring lines LSPY, LVSSY, LVDDY, LCLY, and LCLYINV that supply potentials different from the common potential Vcom and the wiring lines 106 are disposed so that the interlayer insulating film 44 (first insulating film) and the interlayer insulating film 43 (second insulating film) are interposed between the pixel electrodes 9a in the configuration illustrated in FIG. 4B, and are disposed so that the interlayer insulating film 44 (first insulating film), the interlayer insulating film 43 (second insulating film), and the interlayer insulating film 42 (third insulating film) are interposed between the pixel electrodes 9a in the configuration illustrated in FIG. 4C. Therefore, the wiring lines LSPY, LVSSY, LVDDY, LCLY, and LCLYINV that supply potentials in addition to the common potential Vcom and the wiring lines 106 are disposed in the positions farther from the liquid crystal layer 50 than the common potential lines LVcom. Accordingly, in the non-display area 10c, the liquid crystal layer 50 receives influence of the common potential lines LVcom, and hardly receives influence of the wiring lines LSPY, LVSSY, LVDDY, LCLY, and LCLYINV, and the wiring lines 106. Therefore, since the alignment of the liquid crystal layer 50 in the non-display area 10c can be equalized, the decrease of qualities of an image caused by potentials of the wiring lines LSPY, LVSSY, LVDDY, LCLY, and LCLYINV, and the wiring lines 106 can be suppressed. In addition, since the wiring lines LSPY, LVSSY, LVDDY, LCLY, and LCLYINV, and the potential of the wiring lines 106 have less influence on the liquid crystal layer 50 or the seal material 107, extrusion of ionic impurities from the seal material 107 or intrusion of extruded ionic impurities to the display area 10a can be suppressed. Therefore, the decrease of qualities of an image with time can be suppressed.

In addition, the common potential lines LVcom extend along the display area 10a so as to surround the entire circumference of the display area 10a in the non-display area 10c. Further, in the non-display area 10c, the common potential lines LVcom extend in areas interposed between the display area 10a and the inner edge 107f of the seal material 107. Accordingly, throughout the entire circumference of the display area 10a, the alignment of the liquid crystal layer 50 in the non-display area 10c can be equalized.

Another Exemplary Embodiment

The exemplary embodiment described above is a configuration in which the common potential lines LVcom surround the entire circumference of the display area 10a in the non-display area 10c, and extend along the outer edge of the display area 10a in the non-display area 10c, but may be a configuration in which the entire circumference of the display area 10a is not surrounded.

Figure 5:
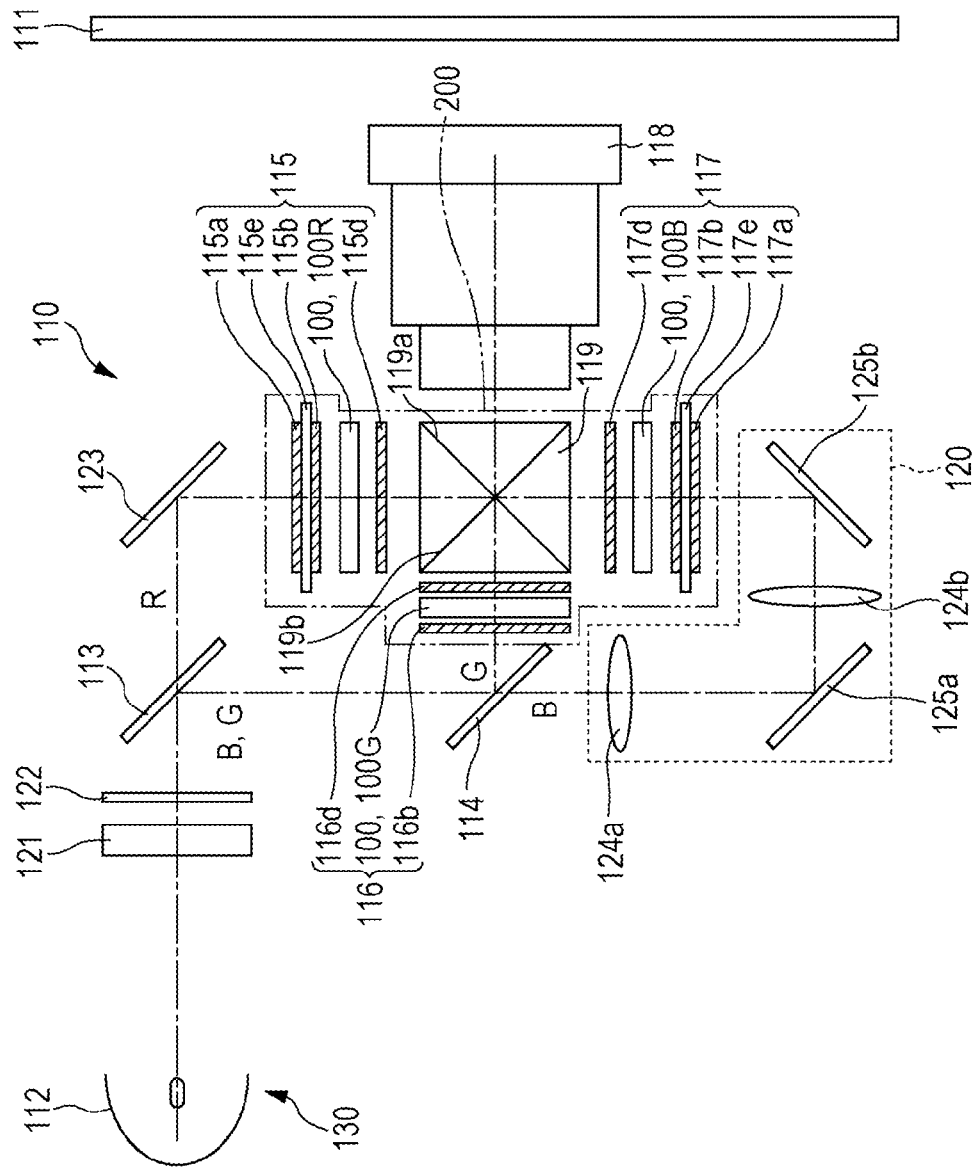
FIG. 5 is a schematic configuration diagram of a projection displaying device (electronic apparatus) and an optical unit to which the invention is applied.

Example of Mounting Crystal Device to Electronic Apparatus Configuration Example of Projection Displaying Device and Optical Unit FIG. 5 is a schematic configuration diagram of a projection displaying device (electronic apparatus) and an optical unit to which the invention is applied.

A projection displaying device 110 illustrated in FIG. 5 is a so-called projection-type projection displaying device that applies light to a screen 111 provided on an observer side, and causing the observer to observe the light reflected on the screen 111. The projection displaying device 110 includes a light source portion 130 including a light source 112, dichroic mirrors 113 and 114, liquid crystal light valves 115 to 117, a projection optical system 118, a cross dichroic prism 119 (synthesis optical system), and a relay system 120, and the liquid crystal device 100 and the cross dichroic prism 119 form an optical unit 200.

The light source 112 is configured with an ultrahigh pressure mercury lamp that supplies light including red light R, green light G, and blue light B. A dichroic mirror 113 transmits the red light R from the light source 112, and reflects the green light G and the blue light B. In addition, among the green light G and the blue light B reflected on the dichroic mirror 113, a dichroic mirror 114 transmits the blue light B and reflects the green light G. In this manner, the dichroic mirrors 113 and 114 configure a color separation optical system that separates light emitted from the light source 112 into the red light R, the green light G, and the blue light B.

Here, an integrator 121 and a polarization converting element 122 are disposed sequentially from the light source 112, between the dichroic mirror 113 and the light source 112. The integrator 121 becomes a configuration of equalizing illuminance distribution of light applied from the light source 112. In addition, the polarization converting element 122 is configured to cause the light from the light source 112 to be polarization having a predetermined vibration direction, for example, s polarization.

A liquid crystal light valve 115 is a transmissive liquid crystal device that modulates the red light transmitted from the dichroic mirror 113, and reflected on a reflection mirror 123 according to the image signal. The liquid crystal light valve 115 includes a λ/2 phase difference plate 115a, a first polarization plate 115b, the liquid crystal device 100 (a liquid crystal panel for red 100R), and a second polarization plate 115d. Here, even if the red light R incident to the liquid crystal light valve 115 is transmitted by the dichroic mirror 113, the polarization of the light is not changed, and thus the polarization is still s polarization.

The λ/2 phase difference plate 115a is an optical element that converts the s polarization incident to the liquid crystal light valve 115 to p polarization. In addition, the first polarization plate 115b is a polarization plate that blocks the s polarization, and transmits the p polarization. Also, the liquid crystal device 100 (the liquid crystal panel for red 100R) is configured to convert the p polarization to the s polarization by the modulation according to the image signal (circular polarization or elliptic polarization, if halftone). Further, the second polarization plate 115d is a polarization plate that blocks the p polarization and transmits the s polarization. Therefore, the liquid crystal light valve 115 is configured to modulate the red light R according to the image signal, and emits the modulated red light R toward the cross dichroic prism 119.

In addition, the λ/2 phase difference plate 115a and the first polarization plate 115b are disposed in a state of being in contact with a transparent glass plate 115e that does not convert polarization, and the λ/2 phase difference plate 115a and the first polarization plate 115b being deformed by generated heat can be avoided.

A liquid crystal light valve 116 is a transmissive liquid crystal device that modulates the green light G that is reflected on the dichroic mirror 113 and reflected on the dichroic mirror 114 according to the image signal. The liquid crystal light valve 116 includes a first polarization plate 116b, the liquid crystal device 100 (a liquid crystal panel for green 100G), and a second polarization plate 116d in the same manner as the liquid crystal light valve 115. The green light G incident to the liquid crystal light valve 116 is s polarization that is reflected on the dichroic mirrors 113 and 114 and is incident to the liquid crystal light valve 116. The first polarization plate 116b is a polarization plate that blocks the p polarization and transmits the s polarization. In addition, the liquid crystal device 100 (the liquid crystal panel for green 100G) is configured to convert the s polarization to the p polarization (circular polarization or elliptic polarization, if halftone) by the modulation according to the image signal. Also, the second polarization plate 116d is a polarization plate that blocks the s polarization and transmits the p polarization. Accordingly, the liquid crystal light valve 116 modulates the green light G according to the image signal, and emits the modulated green light G to the cross dichroic prism 119.

A liquid crystal light valve 117 is a transmissive liquid crystal device that modulates the blue light B that is reflected on the dichroic mirror 113, transmitted through the dichroic mirror 114, and passes the relay system 120 according to the image signal. The liquid crystal light valve 117 includes a λ/2 phase difference plate 117a, a first polarization plate 117b, the liquid crystal device 100 (a liquid crystal panel for blue 100B), and a second polarization plate 117d, in the same manner as the liquid crystal light valves 115 and 116. Here, the blue light B incident to the liquid crystal light valve 117 becomes the s polarization by being reflected on the dichroic mirror 113, transmitted through the dichroic mirror 114, and reflected on two reflection mirrors 125a and 125b of the relay system 120 described below.

The λ/2 phase difference plate 117a is an optical element that converts the s polarization incident to the liquid crystal light valve 117 to p polarization. In addition, the first polarization plate 117b is a polarization plate that blocks the s polarization and transmits the p polarization. Also, the liquid crystal device 100 (the liquid crystal panel for blue 100B) is configured to convert the p polarization to the s polarization (circular polarization or elliptic polarization, if halftone) according to the modulation of the image signal. Further, the second polarization plate 117d is a polarization plate that blocks p polarization and transmits the s polarization. Accordingly, the liquid crystal light valve 117 modulates the blue light B according to the image signal, and emits the modulated blue light B to the cross dichroic prism 119. In addition, the λ/2 phase difference plate 117a and the first polarization plate 117b are disposed in a state of being in contact with a glass plate 117e.

The relay system 120 includes relay lenses 124a and 124b and the reflection mirrors 125a and 125b. The relay lenses 124a and 124b are provided in order to prevent the light loss caused by the long optical path of the blue light B. Here, the relay lens 124a is disposed between the dichroic mirror 114 and the reflection mirror 125a. In addition, the relay lens 124b is disposed between the reflection mirrors 125a and 125b. The reflection mirror 125a is disposed so as to reflect the blue light B transmitted through the dichroic mirror 114 and emitted from the relay lens 124a, toward the relay lens 124b. In addition, a reflection mirror 125b is disposed to reflect the blue light B emitted from the relay lens 124b toward the liquid crystal light valve 117.

The cross dichroic prism 119 is a color synthesis optical system in which the two dichroic films 119a and 119b are orthogonally disposed in an X shape. The dichroic film 119a is a film that reflects the blue light B and transmits the green light G, and the dichroic film 119b is a film that reflects the red light R and transmits the green light G. Accordingly, the cross dichroic prism 119 synthesizes the red light R, the green light G, and the blue light B modulated respectively by the liquid crystal light valves 115 to 117, and emits the red light R, the green light G, and the blue light B toward the projection optical system 118.

In addition, the light incident from the liquid crystal light valves 115 and 117 to the cross dichroic prism 119 is the s polarization, and the light incident from the liquid crystal light valve 116 to the cross dichroic prism 119 is the p polarization. In this manner, by causing the light incident to the cross dichroic prism 119 to be various different kinds of polarization, the light incident from the respective liquid crystal light valves 115 to 117 to the cross dichroic prism 119 can be synthesized. Here, the dichroic films 119a and 119b generally have excellent s polarization reflecting characteristics. Therefore, the red light R and the blue light B reflected on the dichroic films 119a and 119b are caused to be the s polarization and the green light G that transmits the dichroic films 119a and 119b is caused to be the p polarization. The projection optical system 118 is configured to have a projection lens (not illustrated), and projects the light synthesized by the cross dichroic prism 119 to the screen 111.

Another Projection Displaying Device

In the projection displaying device, as the light source portion, an LED light source that emits various colors of light or the like is used, and the projection displaying device may be configured to supply color light emitted from the LED light source to the different liquid crystal device.

Another Electronic Apparatus

In addition to the electronic apparatus described above, the liquid crystal device 100 to which the invention is applied may be used as a direct viewing-type display device in an electronic apparatus such as a cellular phone, a personal digital assistant (PDA), a digital camera, a finder of a camera, a liquid crystal television, a car navigation apparatus, a videophone, a POS terminal, and an apparatus provided with a touch panel.

The entire disclosure of Japanese Patent Application No. 2014-236282, filed Nov. 21, 2014 is expressly incorporated by reference herein.

What is claimed is:

1. A liquid crystal device comprising:
a first substrate including
    a display area in which pixel electrodes are disposed, and
    a non-display area which is disposed to surround the display area;
a second substrate in which at least one common electrode facing the pixel electrodes is disposed;
a seal material which is between the first substrate and the second substrate and which is disposed to surround the display area and the non-display area;
a liquid crystal layer disposed inside an area surrounded by the seal material;
a plurality of wiring lines disposed in the non-display area inside the area surrounded by the seal material; and
a substrate conducting portion which is disposed outside the area surrounded by the seal material, and which brings conduction between conducting electrodes of the first substrate and conducting electrodes of the second substrate,
wherein
    the plurality of wiring lines includes a common potential line to which a common potential applied to the common electrode is supplied by an external control circuit that supplies electrical potentials to the liquid crystal device and other wiring lines to which potentials other than the common potential are supplied by the external control circuit,
    the first substrate includes a first conductive layer, a second conductive layer, and a third conductive layer, from a side close to the liquid crystal layer,
    the pixel electrode is disposed in the first conductive layer,
    the common potential line is disposed in the second conductive layer,
    the other wiring lines are disposed at positions farther from the liquid crystal layer than the common potential line in the non-display area, and
    at least two insulating layers are disposed between the common potential line and the other wiring lines.

2. The liquid crystal device according to claim 1, wherein the first substrate includes
a first insulating layer which is disposed between the first conductive layer and the second conductive layer, and
a second insulating layer which is disposed between the second conductive layer and the third conductive layer, and
the common potential line is connected to the conducting electrodes between the substrates of the first substrate.

3. The liquid crystal device according to claim 1,
wherein the first substrate includes
a first insulating layer which is disposed between the first conductive layer and the second conductive layer, and
a second insulating layer which is disposed between the second conductive layer and the third conductive layer, and
in the non-display area inside the area surrounded by the seal material, only the common potential line is disposed in the second conductive layer.

4. The liquid crystal device according to claim 1,
wherein the common potential line extends along the display area in the non-display area inside the area surrounded by the seal material.

5. The liquid crystal device according to claim 4,
wherein the common potential line extends so as to surround an entire circumference of the display area in the non-display area inside the area surrounded by the seal material.

6. The liquid crystal device according to claim 1,
wherein the second conductive layer has light shielding properties.

7. The liquid crystal device according to claim 1,
wherein the second conductive layer and the third conductive layer have light shielding properties.

8. The liquid crystal device according to claim 6,
wherein the second conductive layer is formed of a material including aluminum.

9. The liquid crystal device according to claim 7,
wherein the second conductive layer and the third conductive layer are formed of a material including aluminum.

10. An electronic apparatus comprising:
the liquid crystal device according to claim 1.

11. The liquid crystal device according to claim 1,
wherein
    a plurality of potentials other than the common potential are supplied to the other wiring lines, and
    at least one potential of the plurality of potentials is different from another potential of the plurality of potentials.

12. The liquid crystal device according to claim 1,
wherein
    each of the plurality of wiring lines is connected to at least one of a plurality of connecting terminals arranged on the first substrate, and
    the common potential is supplied to the plurality of wiring lines through the connecting terminals.

* * * * *